United States Patent
Chiou

(10) Patent No.: US 9,362,970 B2
(45) Date of Patent: Jun. 7, 2016

(54) COVER FOR PACKAGING AND SUPPORTING TABLET COMPUTER

(71) Applicant: Shih-Hsun Chiou, Taipei (TW)

(72) Inventor: Shih-Hsun Chiou, Taipei (TW)

( * ) Notice: Subject to any disclaimer, the term of this patent is extended or adjusted under 35 U.S.C. 154(b) by 43 days.

(21) Appl. No.: 14/308,726

(22) Filed: Jun. 19, 2014

(65) Prior Publication Data

US 2015/0372708 A1   Dec. 24, 2015

Related U.S. Application Data

(63) Continuation-in-part of application No. 13/186,472, filed on Jul. 20, 2011, now abandoned.

(51) Int. Cl.
| | | |
|---|---|---|
| *H04M 1/04* | (2006.01) | |
| *G06F 1/16* | (2006.01) | |
| *H04B 1/3888* | (2015.01) | |

(52) U.S. Cl.
CPC .................................. *H04B 1/3888* (2013.01)

(58) Field of Classification Search
USPC .................................. 455/575.1, 575.3, 575.8
See application file for complete search history.

(56) References Cited

U.S. PATENT DOCUMENTS

| | | | | |
|---|---|---|---|---|
| 8,312,991 B2 * | 11/2012 | Diebel | .................. | A45C 11/00 206/305 |
| 2013/0075281 A1 * | 3/2013 | Diebel | .................. | A45C 11/00 206/45.24 |
| 2013/0083465 A1 * | 4/2013 | Motoishi | ............... | G06F 1/1613 361/679.21 |
| 2014/0083883 A1 * | 3/2014 | Elias | ..................... | G06F 1/1626 206/320 |
| 2014/0370944 A1 * | 12/2014 | Green | .................. | G06F 1/1615 455/575.1 |
| 2015/0194998 A1 * | 7/2015 | Fathollahi | ............ | H04B 1/3888 455/575.8 |
| 2015/0263776 A1 * | 9/2015 | Shyu | .................... | H04B 1/3888 455/575.8 |

* cited by examiner

*Primary Examiner* — Blane J Jackson

(57) ABSTRACT

A cover for packaging and supporting a tablet computer has a lower casing for protecting a tablet computer; an upper cover rotatably connected to the lower casing for protecting the screen of the tablet computer from damage; the upper cover being formed with at least one foldable line area for folding the upper cover along the foldable line area wherein the upper cover is used as a cover and a supporter; the upper cover rotates along the lower casing with an angle greater than 180 degrees; the lower casing is folded along the foldable line areas so as to be formed as a supporter of the lower casing for supporting the tablet computer therein. Thus the computer can stand; and, the angle between the upper cover and the lower casing is adjustable so as to control the standing height of the tablet computer.

6 Claims, 6 Drawing Sheets

COVER FOR PACKAGING AND SUPPORTING TABLET COMPUTER

The present invention is a continuation in part (CIP) of U.S. patent Ser. No. 13/186,472 assigned to the inventor of the present invention, and therefore, the contents of the U.S. patent Ser. No. 13/186,472 is incorporated into the present invention as a part of the present invention.

FIELD OF THE INVENTION

The present invention relates to computer covers, and in particular to a cover for packaging and supporting a tablet computer which provides an upper cover which are used as a cover and a supporter so that a tablet computer packing therein can be well protected and can be supported at any desired orientation.

BACKGROUND OF THE INVENTION

Tablet computers are a main trend of computers. More and more people uses table computer to replace general used personal computers or notebook computers. To well protect the tablet computer, iPad Smart Cover is developed for protecting screens of the iPads. The backside of the iPad is not covered by the iPad Smart Cover. However in many applications of the iPads, tablet computers are needed to stand at a desired orientation for displaying. Generally, the user must get a supporter to support the tablet computer or take it at hand. However this is inconvenient for users.

Thus there is an eager demand for a device which can be used both as a cover and a supporter of a tablet computer so that the tablet computer can be protected well and also be stood at a desire orientation.

SUMMARY OF THE INVENTION

The object of the present invention is to provide a cover for packaging and supporting a tablet computer, wherein other than as a cover for protection of the computer screen, but also the upper cover can be provided as a supporter for supporting the computer at any desired orientation. Thus the user is unnecessary to prepare or find a supporter. It provides convenience to the users.

To achieve above object, the present invention provides a cover for packaging and supporting a tablet computer. The cover comprises a lower casing for protecting a tablet computer; an upper cover having an upper edge rotatably connected to the lower casing for protecting a screen of a tablet computer placed therein from damage.

In one embodiment, the upper cover is formed with a plurality of foldable line areas so that the upper cover is foldable along the foldable line areas; in that, the foldable line areas includes a "Y" shape area with a transversal line area passing through an intersecting point of the Y shape areas; two ends of the Y shape area extending to two upper corners at two ends of the upper edge of the upper cover and the other end of the Y shape area extending to a middle portion of a lower edge of the upper cover. Or the foldable line areas including a "Y" shape area with two line areas extending from an intersecting point of the Y shape areas to two lower corners of the upper cover; two ends of the Y shape area extending to two upper corners at two ends of the upper edge of the upper cover and the other end of the Y shape area extending to a middle portion of a lower edge of the upper cover

DETAILED DESCRIPTION OF THE INVENTION

Figure 1:
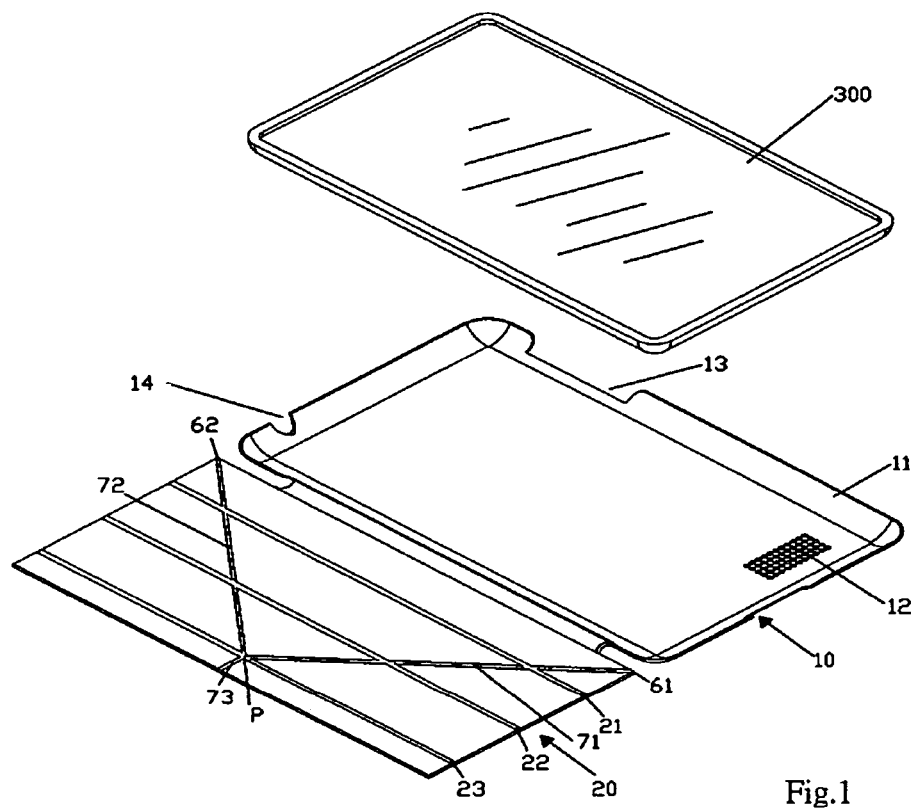
FIG. 1 is a perspective view of the cover of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims. The structure of the present invention will be described herein.

A lower casing 10 serves for protecting a tablet computer 30. A periphery of the lower casing 10 is formed with a frame 11 for enclosing the tablet computer completely to prevent it from damages due to external sources, such as intrusion of powders or evaporations, and damages from collision. The frame 11 and lower casing 10 are formed with a plurality of holes, in that, one hole 14 serves for exposing a USB slot of the tablet computer placed therein, one hole 12 for transmission of sound emitting from the tablet computer therein, and other holes 13 for heat dissipation and other functions.

An upper cover 20 has an upper edge 400 which is pivotally connected to the lower casing 10 for preventing a screen of the tablet computer in the lower casing 10 from damage. The upper cover 20 is formed with at least one foldable line area 21. The number of the foldable line areas is based on requirement in design. Furthermore, in the present invention, the upper cover 20 can be attached to the lower casing 10 by magnets embedded in the lower casing 10 or in the upper cover 20.

In this embodiment shown in FIG. 1, the upper cover 20 has three foldable line areas 21 so that the upper cover 20 is foldable along these foldable line areas 21. Three foldable line areas are initiated from a point P' on a lower edge 403. Two of the three foldable line areas are ended at two corners at two ends of the upper edge 401 and other foldable line is ended at a lateral side 402. Thus, the upper cover 20 is divided into four sections 21, 22, 23 and 24 by the three foldable line areas. The areas between the four sections 21, 22, 23 and 24 are weak areas so that the lower casing 10 is foldable along these areas. In the present invention, the foldable line area between the sections 21, 22 can be neglected so that only three sections are left.

Figure 2:
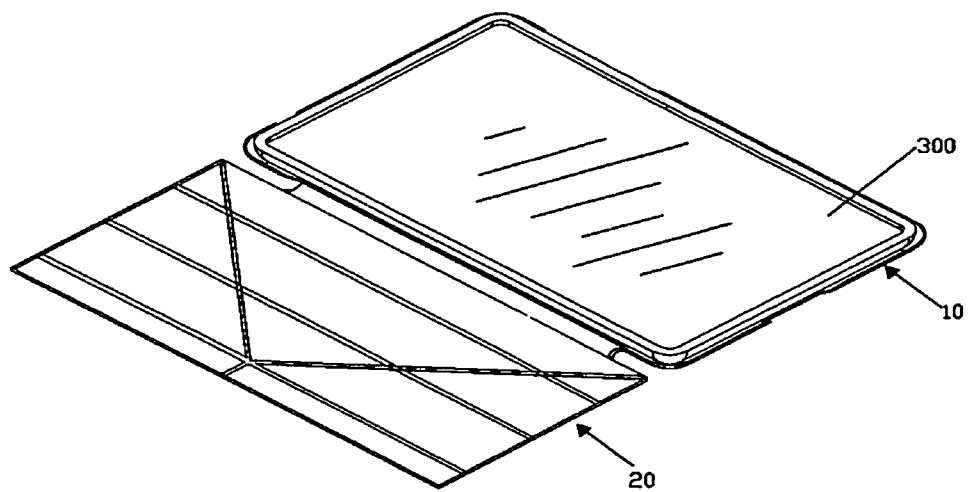
FIG. 2 shows that a tablet computer is placed in the cover of the present invention.
Figure 3:
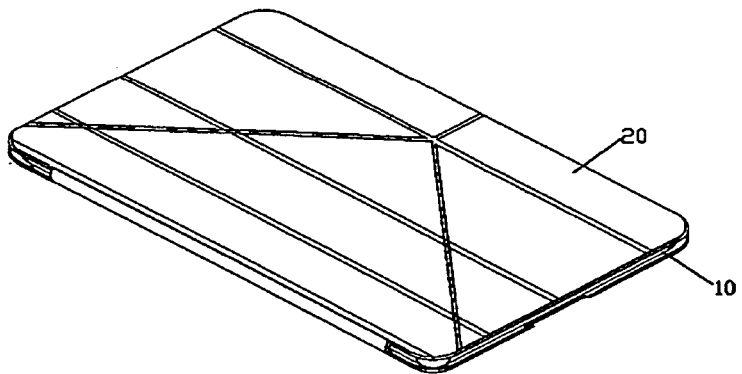
FIG. 3 shows that the upper cover is covered upon the lower casing of the present invention.

FIG. 2 shows the use of the present invention, in that a tablet computer 30 is placed into the lower casing 10. FIG. 3 shows another use of the present invention, in that the upper cover 20 covers upon the lower casing 10 for protecting the tablet computer.

In the present invention, the foldable line areas are not confined to above example. Other foldable line areas are useful.

Figure 4:
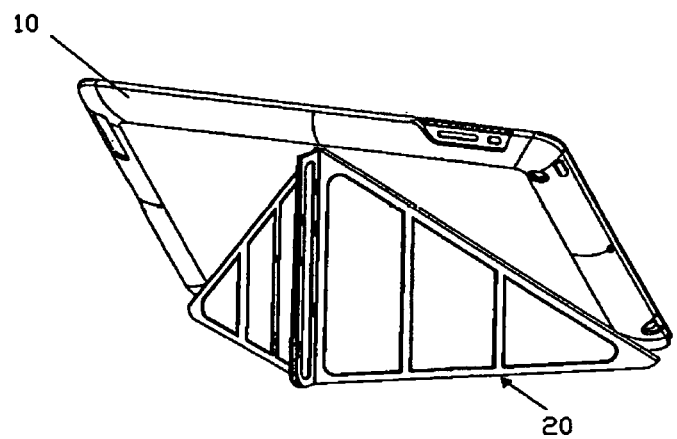
FIG. 4 shows that the upper cover of the present invention is used as a supporter for supporting the computer transversally.

FIG. 4 shows that foldable line areas dividing the upper cover 50 into three trapezoidal shapes. The design is also within the scope of the present invention.

Figure 5:
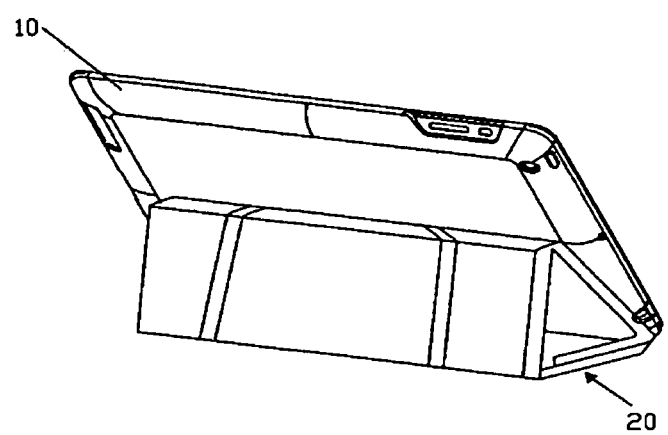
FIG. 5 shows another embodiment of the present invention.
Figure 6:
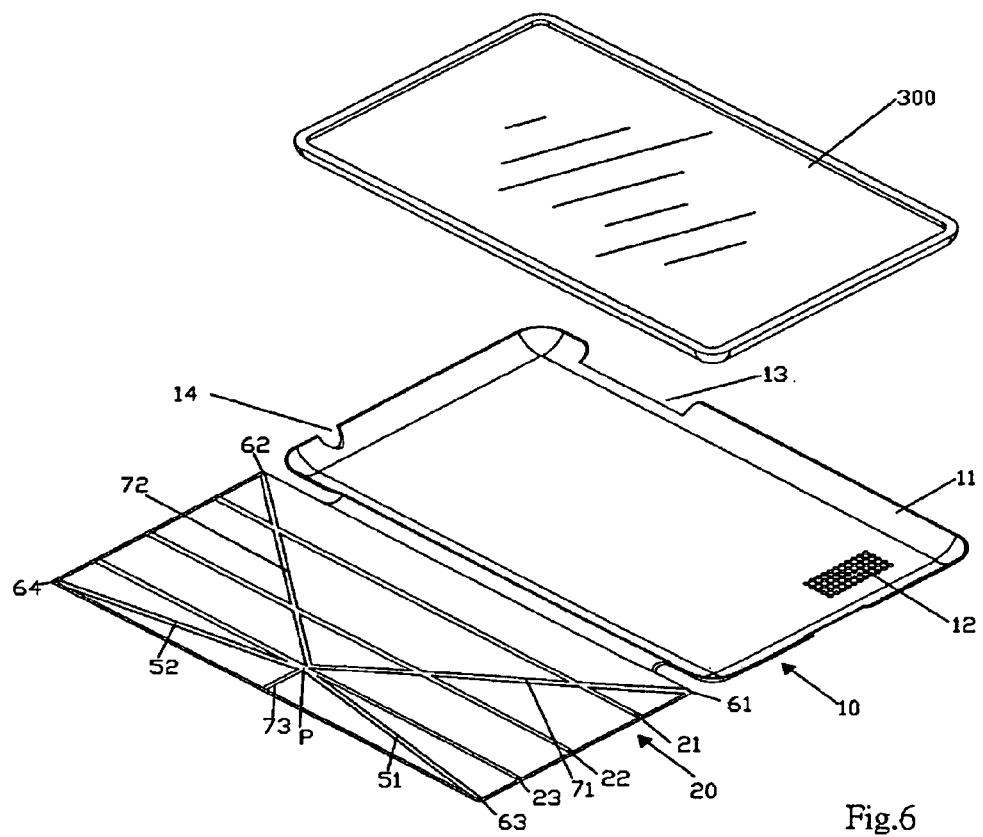
FIG. 6 shows an application of the embodiment illustrated in FIG. 5.

FIGS. 5 and 6 show another embodiment of the present invention. In this the present invention, the present invention includes the following elements:

A lower casing 10 serves for protecting a tablet computer (30) located therein.

An upper cover 40 has an upper edge 400 rotatably connected to the lower casing for protecting a screen of a tablet computer placed therein from damage. The upper cover 40 is formed with a plurality of foldable line areas so that the upper cover 40 is foldable along the foldable line areas; in that, the foldable line areas includes a "Y" shape area with a transversal line area 100 passing through an intersecting point P of the Y shape areas. Two ends of the Y shape area extends to two upper corners 410, 411 at two ends of the upper edge 400 of the upper cover and the other end of the Y shape area extends to a middle portion of a lower edge 403 of the upper cover 40 so that an upper portion of the upper cover is divided into three triangle areas 41, 42, 43 by the three foldable line areas and a lower portion of the upper cover is divided into two rectangular areas 44, 45. The foldable line areas have weak structures which are weaker than other areas of the upper cover 40 so that the upper casing is foldable along the foldable line areas.

Referring to FIG. 6, it is illustrated that the upper cover 40 is used both as a cover and a supporter. The upper cover is rotatable along the lower casing with an angle greater than 180 degrees. The upper cover is foldable along the foldable line areas so as to be formed as a supporter of the lower casing 10 for supporting a tablet computer placed therein. Thus the computer can stand; and the angle between the upper cover and the lower casing is adjustable to control a standing height of the tablet computer.

In FIG. 5, it is illustrated that one triangle area 42 of the three triangle areas 41, 42, 43 is adjacent to the upper edge of the upper cover 40 and has an approximately isosceles triangular shape; and the other two triangular areas 41, 43 are approximately symmetric to the triangular area 42 adjacent to the upper cover and have approximately right triangular shapes.

Similarly to the first embodiment shown in FIG. 1, the lower casing 10 has a frame 11. The lower casing 10 are formed with a plurality of holes, in that, one hole 14 serves for exposing a USB slot of the tablet computer placed therein, one hole 12 for transmission of sound emitting from the tablet computer therein, and other holes 13 for heat dissipation and other functions.

Figure 7A:
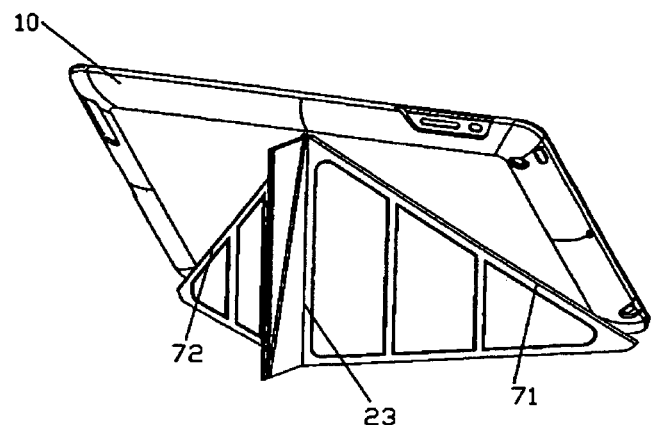
FIG. 7 shows a further embodiment of the present invention.
Figure 7B:
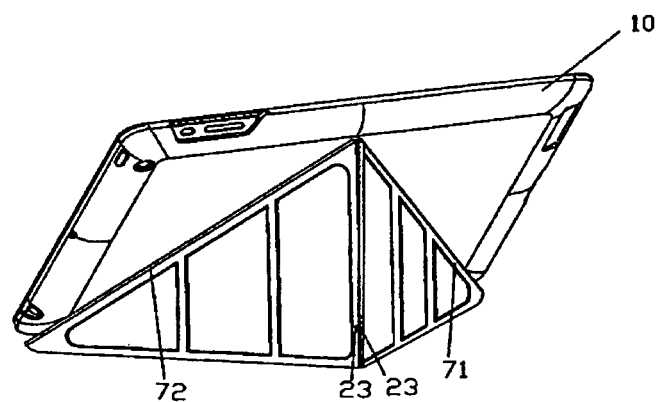

FIG. 7 shows a further embodiment of the present invention, in that the present invention includes the following elements:

A lower casing 10 serves for protecting a tablet computer 30 located therein.

An upper cover 60 has an upper edge 400 rotatably connected to the lower casing for preventing a screen of the tablet computer placed in the lower casing from damage.

The upper cover is formed with a plurality of foldable line areas so that the upper cover is foldable along the foldable line areas. The foldable line areas includes a "Y" shape area with two line areas 101, 102 extending from an intersecting point P of the Y shape areas to two lower corners 412, 413 of the upper cover 60. Two ends of the Y shape area extends to two upper corners 410, 411 at two ends of the upper edge 400 of the upper cover 60 and the other end of the Y shape area extends to a middle portion of a lower edge 403 of the upper cover 60 so that the upper cover 60 is divided into five triangle areas 61, 62, 63, 64 and 65. One of the five triangles 62 contains the upper edge 400 of upper cover 60; two of the five triangles 61, 63 contains two lateral edges 401, 402 of the upper cover 60; and the other two triangle areas 64, 65 contains the lower edge 403 of the upper cover 60.

The foldable line areas have weak structures which are weaker than other areas of the upper cover 60 so that the upper cover 60 is foldable along the foldable line areas.

Figure 8:
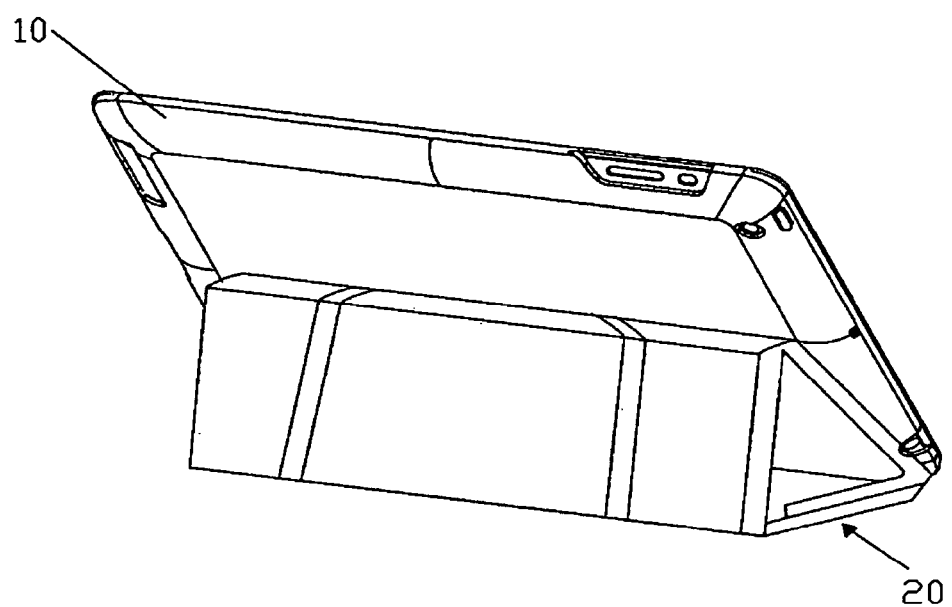
FIG. 8 shows an application of the embodiment illustrated in FIG. 7.

In use, as illustrated in FIG. 8, the upper cover is used as a cover and a supporter. The upper cover 60 is rotatable along the lower casing 10 with an angle greater than 180 degrees. The upper cover casing 60 is foldable along the foldable line areas so as to be formed as a supporter of the lower casing. Thus, the tablet computer 30 placed within the lower casing can stand up, and the angle between the upper cover and the lower casing is adjustable to control a standing height of the tablet computer.

Referring to FIG. 7, it is shown that one of the three triangle areas 62 is adjacent to the upper edge 400 of the upper cover 60 and has an approximately isosceles triangular shape; two triangular areas 61, 63 of the five triangular areas are approximately symmetric to the triangular area 61 adjacent to the upper cover; and the other two 64, 65 of the five triangle areas are adjacent to a lower edge 403 of the upper cover 60 and have approximately right triangular shapes.

Similarly to the first shown in FIG. 1, the lower casing 10 has a frame 11. The lower casing 10 are formed with a plurality of holes, in that, one hole 14 serves for exposing a USB slot of the tablet computer placed therein, one hole 12 for transmission of sound emitting from the tablet computer therein, and other holes 13 for heat dissipation and other functions.

Advantages of the present invention is that the upper cover other than as a cover for protection of the computer screen, but also it can be provided as a supporter for supporting the computer at any desired orientation. Thus the user is unnecessary to prepare or find a supporter. It provides convenience to the users.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims

What is claimed is:

1. A housing capable of supporting a tablet computer in predetermined orientations, comprising:
    a lower casing for protecting a tablet computer;
    an upper cover having an approximate rectangular shape and having an upper side pivotally connected to a lower side of the lower casing for protecting a screen of the tablet computer;
    the upper cover being formed with a Y shape foldable section and three approximate parallel line areas; each foldable line area having a predetermined width and being foldable along the foldable line area:
    the Y shape foldable section being formed by three foldable line areas which are connected at a connecting point; each distal end of two foldable line areas of the Y shape foldable section reaching to two upper corners of the upper cover at the upper side thereof and adjacent to a lower side of the lower casing; another foldable line area of the Y shape foldable section reaching to an approximate middle point of a lower side of the upper cover; one of the three approximate parallel line areas passing through the connecting point of the Y shape foldable section; and wherein the upper cover is used as a cover and a supporter; the upper cover rotates along the lower casing; the upper cover is foldable along the foldable line areas so as to be formed as a supporter of the lower casing for supporting the tablet computer therein.

2. The housing as claimed in claim 1, further comprising two inclined foldable line areas; the two inclined foldable line areas extending from the connecting point to two lower corners of the lower side of the upper cover.

3. The housing as claimed in claim 1, wherein the lower casing are formed with a plurality of holes, one hole serves for exposing a USB slot, one hole for sound transmission, and other holes for heat dissipation and other functions.

4. The housing as claimed in claim 2, wherein the lower casing are formed with a plurality of holes, one hole serves for exposing a USB slot, one hole for sound transmission, and other holes for heat dissipation and other functions.

5. The housing as claimed in claim 1, wherein the upper cover is attached to the lower casing by magnets embedded in the lower casing or in the upper cover.

6. The housing as claimed in claim 2, wherein the upper cover is attached to the lower casing by magnets embedded in the lower casing or in the upper cover.

\* \* \* \* \*